3,536,726
PREPARATION OF α-AMINO-CARBOXYLIC ACIDS
Herbert Fink, Bickenbach, and Günter Schröder, Ober Ramstadt-Eiche, Germany, assignors to Rohm & Haas G.m.b.H., Darmstadt, Germany
No Drawing. Continuation-in-part of application Ser. No. 554,691, June 2, 1966. This application June 28, 1967, Ser. No. 653,597
Claims priority, application Germany, June 4, 1965, R 40,799; July 5, 1966, R 43,630
Int. Cl. C07d 31/36; C07c 101/04
U.S. Cl. 260—295           12 Claims

ABSTRACT OF THE DISCLOSURE

Method for directly making free α-amino-carboxylic acids, useful as animal food supplements, in gas-scrubbing, as pharmaceutical intermediates, and as surface active compounds, by reacting an aldehyde- or ketone-cyanohydrin (or an equivalent mixture of hydrocyanic acid and an aldehyde or ketone) with ammonia and carbon dioxide in water at a temperature above 100° C.

---

This application is a continuation-in-part of copending U.S. patent application Ser. No. 554,691 filed June 2, 1966, now abandoned.

This invention relates to the production of α-amino-carboxylic acids.

A number of methods requiring various intermediary steps as well as specific recovery procedures have been used in the past to prepare α-amino-carboxylic acids. For example, it is known that α-amino-carboxylic acids can be obtained by hydrolyzing an hydantoin or an α-amino-nitrile to the corresponding acid. The hydantoins are first produced at elevated temperatures by reacting an aldehyde or a ketone with potassium cyanide and ammonium carbonate, conveniently under pressure of carbon dioxide. This method is illustrated in German Pat. No. 566,094. Another route for producing hydantoins is described in U.S. Pat. 2,402,134. According to it, hydantoin can be obtained when amino-acetonitrile is heated at 67° C. to 79° C. in an aqueous solution with ammonium carbonate.

The hydrolysis of hydantoins, for example by alkali hydroxides and ammonium alcoholates, causes the five-membered ring to cleave forming hydantoic acid. Under drastic hydrolysis conditions, the corresponding α-amino-carboxylic acid results. According to U.S. Pat. 2,527,366, hydantoins are hydrolyzed at 155° C. to 160° C. at autogenous pressures by means of barium hydroxide. The product is the barium salt of the corresponding α-amino-carboxylic acid. The α-amino-acid is recovered in the conventional manner from the resulting aqueous medium after first precipitating barium therefrom as a water insoluble salt such as the sulfate or carbonate. In this patent, it has been emphasized that barium hydroxide is a hydrolysis agent decidedly superior to ammonia.

According to U.S. Pat. 2,577,920, hydantoins have also been hydrolyzed in an autoclave at a temperature above 130° C. and under autogenous pressure with alkali hydroxides and alkali carbonates, thereby forming a salt of an amino acid. Free amino-carboxylic acid is obtained from its alkali salts, for example, by adding an inorganic acid to the solution. The poorly soluble α-amino-carboxylic acids thereby precipitate in water and can be easily separated from the solution.

Another hydrolytic process is disclosed in U.S. Pat. 2,642,459. According to it, hydantoin is hydrolyzed with at least two mole equivalents of alkali per mole of hydantoin. The product is recovered by first evaporating water to a point where α-amino-carboxylic salt crystals form. The alkali acid salt is then extracted with an alcohol, the salt is converted to a free acid by means of a stronger carboxylic acid, and the precipitated α-amino-carboxylic acid is recovered by filtration from the solution containing the alkali salt of the stronger acid.

A whole series of α-amino-carboxylic acids have been prepared by hydrolyzing the corresponding substituted hydantoins as illustrated in Chemical Reviews, vol. 46, p. 442 (1950).

British Pat. No. 908,735 describes another synthesis of amino acids. According to this process, an aldehyde or a ketone is converted to the corresponding amino nitrile by reacting it in an aqueous solution in the presence of gaseous hydrocyanic acid having more than 0.8 mole of ammonia per mole of the acid. The amino nitrile is in turn hydrolyzed by means of sodium hydroxide. However, the yields obtained have been meager.

In recapitulating, useful processes for producing α-amino-carboxylic acids first involve the production of an hydantoin or of an amino nitrile. The α-amino-carboxylic acid end product is obtained by drastic alkali hydrolysis of these two compounds to form an alkali or alkaline salt of the amino acid, which acid then has to be freed from the salt.

In distinction from the prior art and according to the present invention, α-amino-carboxylic acids are obtained in a one-step reaction by converting an aldehyde cyanohydrin or ketone cyanohydrin into an α-amino-carboxylic acid in an aqueous solution of ammonia and carbon dioxide at a temperature above 100° C. and under pressure, and then isolating the amino acid from the aqueous solution. Instead of ammonia and carbon dioxide, ammonium bicarbonate or ammonium carbonate can be utilized, alone or with ammonia, because these salts readily decompose into ammonia and carbon dioxide.

Another facet of this inventive process involves reacting approximately equimolar amounts of hydrocyanic acid and of an aldehyde or ketone (in place of the cyanohydrin) under similar conditions in aqueous ammonia and ammonium carbonate.

Still another facet of this invention is the preparation of ammonium cyanide by introducing hydrocyanic acid into an aqueous solution of ammonia (or ammonia into an aqueous solution of hydrocyanic acid), introducing an aldehyde or a ketone as well as carbon dioxide into the aqueous solution, and producing an α-amino-carboxylic acid according to the novel process.

Suitable carbonyl compounds, i.e. aldehydes and ketones, useful in the present invention include aliphatic, aromatic, and heterocyclic compounds. The corresponding cyanohydrins are obvious from their aldehyde and ketone precursors.

In general, the suitable carbonyl compounds are represented by the formula:

wherein R is hydrogen; alkyl having from 1 to 22 carbon atoms; substituted alkyl wherein the substituents are hydroxy, carboxy, mercapto, lower alkoxy, or polyalkoxy groups; and unsaturated aliphatic groups having up to 22 carbon atoms; $R_1$ is hydrogen; alkyl having from 1 to 22 carbon atoms; substituted alkyl, wherein the substituents are hydroxy, carboxy, mercapto, lower alkoxy, or polyalkoxy groups; unsaturated aliphatic groups of up to 22 carbon atoms; aryl; and substituted aryl wherein the substituents are hydroxy, alkoxy, nitro, amino, and halogeno groups; and heterocyclic groups wherein the heterocycle contains nitrogen, oxygen or sulfur as the hetero atoms; or R and $R_1$ when joined form with the carbonyl carbon atom a cyclic compound.

More specifically, these aldehyde and ketone compounds may be represented by the formula:

wherein R and $R_1$ are at least one of the following radicals and are further illustrated by the exemplified compounds: hydrogen, e.g., formaldehyde; alkyl and alkenyl of up to 22 carbon atoms, e.g. acetaldehyde, butyraldehyde, acetone, 2-methylpropanal, diethylketone, dipropylketone (heptanone), dibutylketone, crotonaldehyde, myristaldehyde, myristone; substituted lower alkyl wherein the substituents are hydroxy, lower alkoxy, and mercapto radicals, e.g., glycolaldehyde, aldol, β-methyl-mercapto-propionaldehyde, methoxy propionaldehyde, methoxy butyraldehyde, and the like; aromatic radicals of up to eight carbon atoms, e.g., benzaldehyde, p-hydroxy benzaldehyde, acetophenone, phenyl acetaldehyde, p-amino-benzaldehyde, nitro benzaldehyde, benzil, and the like; a heterocycle containing a nitrogen or an oxygen atom having from 4 to 8 carbon atoms, e.g., furfural, pyridine aldehyde, indole aldehyde and the like; or R and $R_1$ are joined to form a cyclic compound, e.g., cyclopentanone, cyclohexanone, cycloheptanone and the like. Only one aromatic ring can be directly attached to the carbonyl carbon atom. The corresponding cyanohydrin compounds are obvious from the above aldehyde and ketone precursors.

The process of the invention can be carried out discontinuously or in a continuous or semi-continuous fashion.

A preferred mode of operating involves introducing a cyanohydrin (or an equivalent mixture of hydrocyanic acid and an aldehyde or ketone) into a reactor containing an aqueous solution of ammonia and carbon dioxide at about the same rate at which the cyanohydrin is being converted to an amino carboxylic acid. It is advantageous to control the rate of introduction of the cyanohydrin (or of an equivalent mixture of ketone or aldehyde with hydrocyanic acid) so that no more than 10 percent by weight of unreacted cyanohydrin is present in the reaction mixture. The introduction of cyanohydrin can be carried out semi-continuously for a specified period of time, for example until a reaction flask is filled, or can be carried out in a fully continuous manner. In the latter case, a portion of the precipitating amino-carboxylic acid exceeding the saturation concentration is withdrawn from the reactor together with a portion of the reaction solution, the solid product is separated by filtering or centrifuging, and the mother liquor is returned to the reaction vessel. The reaction can also be carried out in a reaction tube carrying an aqueous solution of carbon dioxide and ammonia, heated to over 100° C. and under a corresponding pressure, into which cyanohydrin is fed under pressure at one or more points. Still other apparatus in which the new process can be carried out will be evident to those skilled in the art.

By introducing a cyanohydrin (or its equivalent) into the reaction system at about the same rate at which it is removed by conversion, a highly concentrated solution of the amino carboxylic acid product, or a slurry of acid in a concentrated mother liquor, is obtained. Also the formation of unwanted, usually dark-colored, by-products is avoided.

In general, the proportions of the reactants may vary over a considerable range. Suitable ranges of the various components useful in the reaction have been found to be in an approximate mole ratio with the above-mentioned carbonyl compound as follows: hydrocyanic acid from 1:1 to 3.5:1; carbon dioxide from 1:1 to 10:1; ammonium carbonate from 1:1 to 10:1; ammonia from 1:1 to 200:1; and, water from 20:1 to 1000:1. When operating discontinuously, an especially suitable range of proportions has been found to be the following, based on one mole of the cyanohydrin, or an approximately equimolar mixture of its precursor carbonyl compound and hydrocyanic acid: about 1 to 4 moles of carbon dioxide obtained either from carbon dioxide or ammonium carbonate; about 4 to 10 moles of ammonia; and, about 20 to 100 moles of water as the reaction medium. When operating with continuous or semi-continuous addition of cyanohydrin (or its equivalent), the following range of proportions based on one mole of cyanohydrin is especially suitable: about 1 to 10 moles of carbon dioxide; about 1 to 100 moles of ammonia; and about 100 to 1000 moles of water.

Reaction times depend on the various cyanohydrins and their carbonyl precursor counterpart, as well as on the respective conversion temperatures. An average reaction time is from three to eight hours at a temperature from 120° C. to 180° C.

When comparing the novel process with the prior art processes, an essential distinction of the present process is the obtention is good yield of free α-amino-carboxylic acid and the elimination of the additional processing heretofore required for conversion of α-amino-carboxylic acid salts to the free acid.

The following examples further illustrate the invention and should not be construed as limiting its broader scope.

EXAMPLE 1

Preparation of α-amino-isobutyric acid

α-Amino-isobutyric acid is prepared by converting acetone cyanohydrin in presence of water, ammonia, and carbon dioxide according the the following reaction:

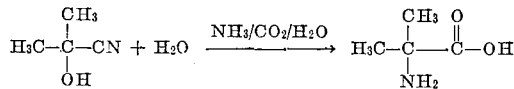

(a) 484 grams (11 moles) of carbon dioxide were introduced over a period of one hour into a 20-liter stainless steel autoclave containing 11 liters of a 10% aqueous ammonia solution (62 moles of ammonia, 526 moles of water) and provided with a mixing means, a gas supply line and an electric heating means. Thereafter, 850 grams of acetone cyanohydrin (10 moles) were added. The mixture was heated to 160° C. (causing the pressure to rise) and stirred for six hours. After cooling and filtering, the aqueous reactant solution was distilled to dryness. The dry product was washed with 1.5 liters of methanol and dried under vacuum at 80° C. The yield of this product was 883 grams, which is equivalent to 85.6% of the theoretical yield. The α-amino-isobutyric acid content of this product was determined by formaldehyde titration to be 98.0%. The nitrogen content of this product was 13.4% compared to a theoretical value of 13.6%.

(b) 484 grams of carbon dioxide (11 moles) were introduced over one and a half hours into the above-described autoclave containing 11 liters of a 10% aqueous ammonia solution (62 moles amonia, 526 moles water). This solution was then digested with 580 grams acetone (10 moles) and 270 grams of hydrocyanic acid (10 moles). It was further treated as in (a) above. 771 grams of an impure material were isolated, or 74.5% of the theoretical yield. According to formaldehyde titration, the product consisted of 95.3% of α-amino-isobutyric acid. The nitrogen content of the product was determined to be 13.5%.

The impure product was recrystallized by first dissolving 600 grams of the 95.3% assayed product in 2.5 liters of boiling water and filtering this hot solution. After cooling to room temperature, a precipitate (Fraction A) was formed, separated by filtration and dried under a vacuum at 100° C. The mother liquor was concentrated by evaporation until crystals started to form anew. Again the solution was cooled, filtered, and the recovered crystals dried thus yielding Fraction B. In a similar manner, the mother liquor was worked up five more times (Fractions C to G).

The following amounts of α-amino-isobutyric acid were isolated. These are shown in the table below.

| Fraction: | Yield | | Nitrogen content in percent |
|---|---|---|---|
| | In grams | As percent recovered | |
| A | 185 | 30.8 | 13.6 |
| B | 143 | 23.8 | 13.7 |
| C | 88 | 14.7 | 13.3 |
| D | 53.8 | 9.0 | 13.8 |
| E | 41.7 | 7.0 | 13.8 |
| F | 22.9 | 3.8 | 13.7 |
| G | 27.6 | 4.6 | 13.9 |

EXAMPLE 2

Preparation of α-amino-propionic acid

To a 2-liter, low-pressure autoclave equipped with a stirrer and electrical heating means and containing 71 grams (1 mole) of acetaldehyde cyanohydrin, 1000 ml. of an 8% aqueous ammonia solution (4.5 moles ammonia, 49 moles water) and 114 grams (1 mole) of ammonium carbonate monohydrate were added. The mixture was heated for six hours at 160° C. After cooling, the reaction medium was filtered and evaporated to dryness. The product was washed with 250 moles of methanol and dried under vacuum at 80° C. 69.2 grams of an impure product were obtained having an amino-carboxylic acid content of 96.3%, which corresponds to 75% of the theoretical yield of α-amino-propionic acid.

EXAMPLE 3

Preparation of α-phenyl-α-amino-acetic acid 106 grams of benzaldehyde, 1000 ml. of an 8% aqueous ammonia solution (4.5 moles ammonia, 49 moles water), 40 ml. of water-free hydrocyanic acid (1 mole), and 114 grams (1 mole) of ammonium carbonate monohydrate were held for 5 hours at 160° C. in a 2-liter, low-pressure autoclave.

After the reaction was terminated and the reaction mixture cooled, the poorly soluble α-phenyl-α-amino-acetic acid was filtered, washed with 250 ml. of methanol, and dried under vacuum at 80° C. The yield was 140 grams of a raw material assayed as 98% amino acid, which corresponds to a theoretical yield of 91%.

EXAMPLE 4

Preparation of glycine 57.0 grams (1 mole) of formaldehyde cyanohydrin, 1000 ml. of an 8% ammonia solution (4.5 moles ammonia, 49 moles water), and 114 grams (1 mole) of ammonium carbonate monohydrate were heated to 160° C. and stirred for 6 hours at this temperature. Thereafter, this solution was clarified with active carbon and evaporated to dryness. The product obtained was washed with 250 ml. of methanol and dried under a vacuum at 80° C. The yield was 73.7 grams of an impure product assayed as 86% amino acid, which corresponds to 85% of the theoretical yield of glycine.

EXAMPLE 5

Preparation of d,l-methionine 104.2 grams (1 mole) of β-methylmercapto-propionaldehyde, 40.5 grams (1.5 moles) of water-free hydrocyanic acid, 4451 grams of a 19.1% aqueous ammonia solution (50 moles ammonia, 200 moles water), and 570 grams of ammonium carbonate monohydrate were heated to 130° C. in a 10-liter, low-pressure autoclave and the mixture stirred at that temperature for 8 hours.

Thereafter, the solution was filtered, evaporated to dryness, the remainder left after distillation dissolved in a slight amount of water, and the amino acid precipitated by addition of ethanol. 100 grams of an impure product assayed as 99.5% amino acid were obtained. This corresponds to 66.7% of the theoretical yield of d,l-methione.

EXAMPLE 6

Preparation of 1-amino-cyclohexane-carboxylic acid-(1)

98 grams (1 mole) of cyclohexanone, 40.5 grams (1.5 moles) of water-free hydrocyanic acid, 4745 grams of a 9% aqueous ammonia solution (25 moles of ammonia, 240 moles water), and 285 grams (2.5 moles) of ammonium carbonate monohydrate mixture were heated at 160° C. and stirred for 15 hours in a 10-liter, low-pressure autoclave. This solution was cooled, evaporated to dryness, and the product remaining after evaporation washed with hot alcohol and dried. The yield was 133.6 grams assayed as 97% amino carboxylic acid corresponding to 90.4% of the theoretical yield.

EXAMPLE 7

Preparation of 1-amino-cyclopentane-carboxylic acid-(1)

A mixture of 84 grams (1 mole) of cyclopentanone, 29.7 grams (1.1 moles) of water-free hydrocyanic acid, 4385 grams of a 9.7% aqueous ammonia solution (25 moles ammonia, 220 moles water), and 285 grams (2.5 moles) of ammonium carbonate monohydrate was heated to 160° C. and held for 15 hours at this temperature.

A product obtained by evaporating the solution was washed with hot ethanol and dried. The yield was 116.4 grams assayed as 98.5% amino acid, which corresponds to 88.8% of the theoretical yield of 1-amino-cyclopentane-carboxylic acid-(1).

EXAMPLE 8

Preparation of α-phenyl-α-amino-propionic acid

A mixture of 120 grams (1 mole) acetophenone, 27 grams (1 mole) water-free hydrocyanic acid, 4538 grams of a 12.7% aqueous ammonia solution (34 moles ammonia, 220 moles water), and 285 grams (2.5 moles) of ammonium carbonate monohydrate was introduced into a 10-liter, low-pressure autoclave and heated for 10 hours at 160° C. Thereafter, the reactant mixture was evaporated to dryness and the product washed several times with hot methanol. The impure amino acid obtained was dissolved in a small amount of water, precipitated with methanol, isolated, and dried. 110 grams of α-phenyl-α-amino-propionic acid were obtained, which correspond to 66.7% of the theoretical yield.

EXAMPLE 9

Preparation of phenylalanine 240.3 grams of a 50% solution of phenylacetaldehyde (1 mole) in benzyl alcohol were added to a mixture of 29.7 grams (1.1 moles) of hydrocyanic acid, 570 grams (5 moles) of ammonium carbonate monohydrate, and 2065 grams of a 4.1% aqueous ammonia solution (5 moles of ammonia, 110 moles of water). The mixture was stirred for six hours at 160° C. in a low-pressure autoclave. After cooling, the reactant solution was filtered and evaporated to dryness.

The impure amino acid obtained as the product of evaporation was washed several times with ethanol and recrystallized from water-ethanol solution (1:5). The yield was 68 grams, which corresponds to 41% of the theoretical yield of phenylalanine.

EXAMPLE 10

Preparation of β-phenyl-α-amino-propionic acid

A mixture of 29.7 grams (1.1 moles) of water-free hydrocyanic acid, 285 grams (2.5 moles) of ammonium carbonate monohydrate, and 4385 grams of a 9.7% aqueous ammonia solution (25 moles ammonia, 220 moles water) was added to 204 grams of a 59% solution of phenylacetaldehyde (1 mole) in benzyl alcohol contained in a 10-liter, low-pressure autoclave. The mixture was heated for 10 hours at 160° C. After cooling, the solution was evaporated. The impure amino acid was washed with hot ethanol and precipitated from water-ethanol solution (1:5) and dried. 136.3 grams of β-phenyl-α-amino-propionic acid were obtained, which correspond to 82.5% of the theoretical yield.

EXAMPLE 11

Preparation of 1-amino-cyclopentane-carboxylic acid-(1)

A mixture of 84 grams (1 mole) of cyclopentanone, 32.4 grams (1.2 moles) of water-free hydrocyanic acid, 1199 grams of a 9.4% aqueous ammonia solution (7 moles ammonia, 60 moles water), and 285 grams (2.5 moles) of ammonium carbonate monohydrate was heated for 8 hours at 160° C. in a 2-liter, low-pressure autoclave. The reactant mixture was cooled and next filtered and evaporated to dryness. The product obtained was washed with hot ethanol and dried at 110° C. 91.6 grams assayed as 98.9% amino acid were obtained, which correspond to a yield of 70.1% of the theoretical yield based on 1-amino-cyclopentane-carboxylic acid-(1).

EXAMPLE 12

Preparation of 1-amino-cycloheptane-carboxylic acid-(1)

112.2 grams (1 mole) of cycloheptanone, 27 grams (1 mole) of water-free hydrocyanic acid, 986 grams of a 6.9% aqueous solution of ammonia (4.0 moles of ammonia, 51 moles water ), and 125.4 grams (1.1 moles) of ammonium carbonate monohydrate were heated for 10 hours at 160° C. under autogenous pressure. After cooling, the reactant solution was filtered while still hot and evaporated to dryness. The product was washed several times with hot ethanol. 98.0 grams of 1-amino-cycloheptane-carboxylic acid-(1) were obtained, which correspond to 62.5% of the theoretical yield.

EXAMPLE 13

Preparation of β-methyl-α-amino-butyric acid 72.1 grams (1 mole) of isobutyraldehyde, 27 grams (1 mole) of water-free hydrocyanic acid, 944 grams of a 4.65% aqueous solution of ammonia (2.6 moles ammonia, 50 moles water), and 125.4 grams (1.1 moles) of ammonium carbonate monohydrate were introduced into a 2-liter, low-pressure type autoclave and heated for six hours at 140° C. Next, the cooled contents of the autoclave were filtered and evaporated to dryness. The product was washed with ethanol and crystallized in aqueous ethanol to obtain 50.0 grams of purified β-methyl-α-amino-butyric acid. This amount corresponds to a theoretical yield of 42.7%.

EXAMPLE 14

Preparation of β-methyl-α-amino-butyric acid 49.5 grams (0.5 mole) of isobutyraldehyde cyanohydrin, 1090 grams of a 2.5% aqueous ammonia solution (1.6 moles ammonia, 59 moles water), and 140 grams (1.25 moles) of ammonium carbonate monohydrate were heated for six hours at 160° C. in a low-pressure autoclave. The reactant solution was worked up as in Example 13. 76.8 grams of pure amino acid were obtained corresponding to 65.6% of the theoretical yield.

EXAMPLE 15

Preparation of 4-amino-heptane-carboxylic acid-(4)

A mixture of 114.2 grams (1 mole) of heptanone-(4), 40.5 grams (1.5 moles) of water-free hydrocyanic acid, 4555 grams of a 13% aqueous solution of ammonia (35 moles ammonia, 220 moles water), and 280 grams of ammonium carbonate monohydrate was heated and stirred in a 10-liter, low-pressure autoclave for 15 hours at a temperature of 150° C. under autogenous pressure. After the product was cooled at the end of the conversion, the autoclave contents were filtered. The filtered product was evaporated to dryness and the remainder washed with acetone and alcohol (1:1). 66.0 grams of amino acid were obtained, which correspond to 41.5% of the theoretical yield.

EXAMPLE 16

Preparation of 4-amino-heptane-carboxylic acid-(4)

The conversion of heptanone-(4) was repeated according to Example 15 but using 8720 grams of a 19.9% aqueous ammonia solution (90 moles ammonia, 400 moles water). The reaction lasted ten hours. The work-up procedure was the same as in Example 15. 85 grams of 4-amino-heptane-carboxylic acid-(4) were obtained, which correspond to the theoretical yield of 54%.

EXAMPLE 17

Preparation of 4-amino-heptane-carboxylic acid-(4)

The conversion of heptanone-(4) was repeated according to Example 15, except that 17,450 grams of a 17.5% aqueous ammonia solution (180 moles ammonia, 800 moles water), and 1140 grams (10 moles) of ammonium carbonate monohydrate were used. The reaction lasted six hours. The work-up procedure was the same as in Example 15. The yield was 129.5 grams of 4-amino-heptane-carboxylic acid-(4) corresponding to 81.5% of the theoretical yield.

EXAMPLE 18

Preparation of β-hydroxy-α-amino-propionic acid

A mixture of 60.0 grams (1 mole) of glycol aldehyde, 27 grams (1 mole) of water-free hydrocyanic acid, 387.6 grams (3.4 moles) of ammonium carbonate monohydrate, and 5889 grams of a 19.7% aqueous ammonia solution (57 moles of ammonia, 273 moles water) was stirred for six hours in an autoclave at a temperature of 120° C. The cooled contents of the autoclave were filtered and evaporated to dryness. A sirupy product was obtained and dissolved in 95% concentrated ethanol. By slow evaporation of the solution, the amino-carboxylic acid was crystallized as a slightly yellow colored crystalline precipitate. It was drained, washed with ethanol, and dried in a vacuum at 50 to 60° C. The yield was 56.7 grams corresponding to 54.0% of the theoretical yield.

EXAMPLE 19

Preparation of γ-hydroxy-α-amino-n-valeric acid 88.1 grams (1 mole) of aldol, 27 grams (1 mole) of water-free hydrocyanic acid, and 456 grams (4 moles) of ammonium carbonate monohydrate were dissolved in 1000 grams (55 moles) water and heated in an autoclave for six hours at 160° C. Thereafter, the product was filtered, evaporated to dryness, and refluxed in boiling isopropyl alcohol. A crystalline precipitate which formed was drained, washed with acetone and ether, and dried under vacuum at 60° C. The yield was 98 grams of γ-hydroxy-α-amino-n-valeric acid, which corresponds to 73.7% of the theoretical yield.

EXAMPLE 20

Preparation of α-(p-hydroxy-phenyl)-α-amino-acetic acid 122.1 grams (1 mole) of p-hydroxy-benzaldehyde, 27 grams (1 mole) of hydrocyanic acid, 912 grams (8 moles) of ammonium carbonate monohydrate, and 4584 grams of a 5% aqueous ammonia solution (13.6 moles ammonia, 242 moles water) were heated for six hours at 120° C. in a low-pressure autoclave. The reactant solution was filtered and evaporated to dryness. The product was washed several times with alcohol and dried under a vacuum (by means of an aspirator) at 50 to 60° C. The yield was 84 grams, which corresponds to 50.3% of the theoretical yield.

EXAMPLE 21

Preparation of β-indolyl-glycine 145.2 grams (1 mole) of indole-3-aldehyde, 27 grams (1 mole) of water-free hydrocyanic acid, and 912 grams (8 moles) of ammonium carbonate monohydrate were added to 5978 grams of a 9.65% aqueous ammonia solution (34 moles ammonia, 300 moles water). This mixture was held in an autoclave six hours at 120° C. The autoclave contents were cooled to 50 to 60° C. and evaporated to dryness. The product was thereafter washed with hot alcohol and recrystallized from aqueous ethanol. The yield was 56.3 grams of β-indolyl-glycine, which corresponds to 29.9% of the theoretical yield.

EXAMPLE 22

Preparation of β-pyridyl-glycine 107.1 grams (1 mole) of pyridine-3-aldehyde, 40.5 grams (1.5 moles) of water-free hydrocyanic acid, 570 grams (5 moles) of ammonium carbonate monohydrate, and 4070 grams of a 2.7% aqueous ammonia solution (6.5 moles ammonia, 220 moles water) were heated for six hours at 130° C. in 10-liter low-pressure autoclave. The autoclave contents were cooled, filtered, and evaporated to dryness. The product was refluxed for one hour with boiling ethanol. After cooling, the precipitate was drained, washed with cold ethanol and dried. 120.4 grams of the amino acid were obtained, which correspond to 79.0% of the theoretical yield.

EXAMPLE 23

Preparation of α-furyl-glycine

A mixture of 97.1 grams (1 mole) of furfural, 29.7 grams (1.1 moles) of water-free hydrocyanic acid, 400 grams (3.5 moles) of ammonium carbonate monohydrate, and 4664 grams of a 9.35% aqueous ammonia solution (25.5 moles ammonia, 235 moles water) was heated in an autoclave for six hours at 130° C. The reactant solution was filtered and evaporated to dryness. The product was refluxed with boiling ethanol and the cooled precipitate drained and dried. The yield was 112.5 grams, which corresponds to 80.4% of the theoretical yield.

EXAMPLE 24

Preparation of α,α'-diamino-α,α'-diphenyl-succinic acid 210.2 grams (1 mole) of benzil, 56.7 grams (2.1 moles) of water-free hydrocyanic acid, 570 grams (5 moles) of ammonium carbonate monohydrate, and 4555 grams of a 13% aqueous ammonia solution (35 moles ammonia, 220 moles water) were heated in an autoclave for ten hours at 160° C. Next, the reactant mixture was filtered and evaporated to dryness. The product was washed several times with cold ethanol and dried. The yield was 155 grams of the amino acid, which corresponds to 50.5% of the theoretical yield.

EXAMPLE 25

Preparation of α,α'-diamino-α,α'-diphenyl-succinic acid

A mixture of 210.2 grams (1 mole) of benzil, 81 grams (3.0 moles) of water-free hydrocyanic acid, 570 grams (5.0 moles) of ammonium carbonate monohydrate, and 9880 grams of a 12.5% aqueous ammonia solution (70 moles ammonia, 463 moles water) was converted and worked up the same as in Example 24. The yield was 198 grams of amino acid, which corresponds to 66.0% of the theoretical yield.

EXAMPLE 26

Preparation of α-amino-pentadecane-carboxylic acid

A mixture of 21.24 grams (0.1 mole) of myristaldehyde, 2.7 grams (0.1 mole) of water-free hydrocyanic acid, 28.5 grams (0.25 mole) of ammonium carbonate monohydrate, and 1206 grams of a 25.4% aqueous ammonia solution (18 moles ammonia, 50 moles water) was heated and stirred for ten hours at 180° C. in a 2-liter, low-pressure autoclave. The cooled contents of the autoclave were evaporated and dried in vacuo at 50° C. By extracting the product with n-pentane, the unconverted myristaldehyde was removed. As the remainder from extraction and as determined by titration, 8.4 grams of a 92.2% amino acid were obtained, which corresponds to 30.2% of the theoretical yield of α-amino-pentadecane-carboxylic acid.

EXAMPLE 27

Preparation of α-amino-isobutyric acid by semi-continuous and discontinuous processes 10.51 kilograms of an aqueous solution of ammonia and ammonium carbonate (500 moles $H_2O$, 63 moles of ammonia, and 10 moles $CO_2$) were heated in a twenty liter steel autoclave at 180° C. 2.55 kilograms (30 moles) of acetone cyanohydrin were introduced into the hot solution at a rate of 4 moles per hour with the aid of a dosing pump. A pressure of 40 atmospheres was reached.

After 7½ hours, the reaction was interrupted and the cooled reaction solution, together with precipitated crystalline raw amino acid, was steamed to dryness. The residue was washed with methanol and dried at 80° C. under vacuum.

2.30 kilograms of a 97.2 percent crude amino acid were obtained, corresponding to a yield of α-amino-isobutyric acid of 72.5 percent of theory.

This semi-continuous preparation of amino-isobutyric acid was compared with a batch-process run in which the same quantities of starting products were heated at the same reaction temperature, i.e. in which 13.10 kilograms of an aqueous solution of acetone cyanohydrin, ammonia, and ammonium carbonate (30 moles of acetone cyanohydrin, 500 moles of $H_2O$, 63 moles ammonia, 10 moles $CO_2$) were heated in a 20-liter steel autoclave for eight hours at 180° C. The cooled contents of the autoclave were filtered, steamed to dryness, and the residue was washed with methanol. 0.759 kilogram of an 86.3 percent brown-colored crude amino-acid product were obtained, corresponding to 21.2 percent of the theoretical yield.

EXAMPLE 28

Continuous preparation of α-amino-isobutyric acid 2.24 kilograms of ammonium carbonate monohydrate, 5 liters (4.43 kilograms) of a 33 percent aqueous ammonia solution, and 5 kilograms of water (corresponding with 482 moles of $H_2O$, 125 moles of $NH_3$ and 20 moles of $CO_2$) were introduced into a 20 liter stirred autoclave. At 160° C. and under an autogenous pressure of about 30 atmospheres, acetone cyanohydrin was pumped into the autoclave with a dosage pump. The rate of pumping was about 0.202 kilogram per hour (2.38 moles per hour).

After 12½ hours (the amount of acetone cyanohydrin added by pumping amounted to 30 moles), the hot reaction solution was withdrawn from the autoclave in amounts of about 3–4 liters per hour. On cooling, α-amino-isobutyric acid separated in the form of colorless crystals and was separated by filtration.

The crude amino-acid was washed with methanol and dried under vacuum at 80° C. In this manner, a 90 percent raw aminoisobutyric acid product was obtained in a yield of 77 percent of theory calculated on the amount of acetone cyanohydrin pumped into the mixture in the corresponding time involved.

The mother liquor from the α-amino-isobutyric acid crystallization was pumped back into the reaction vessel together with one mole of water for every mole of separated amino-acid. The total reaction time was 31½ hours.

EXAMPLE 29

Preparation of alanine 10.5 kilograms of an aqueous solution of ammonia and ammonium carbonate (corresponding to 500 moles $H_2O$, 60 moles $NH_3$ and 11 moles $CO_2$) were heated to 160° C. in a 20 liter steel autoclave.

2.490 kilograms (35 moles) of acetaldehyde cyanohydrin were pumped into the hot reaction solution with a dosage pump at a rate of 1.5 moles per hour. Subsequently, the temperature of the solution was held for 3 hours at 160° C.

The cooled reaction solution was steamed to dryness together with the crude amino acid which had already precipitated. The residue was washed with a small amount of methanol. The crude amino acid was dried at 80° in vacuum.

The yield of alanine was 75 percent of theory.

EXAMPLE 30

Preparation of 1-amino-cyclohexane-carboxylic acid-(1)

10.6 kilograms of an aqueous solution of ammonium carbonate and ammonia (corresponding to 500 moles $H_2O$, 70 moles of $NH_3$ and 10 moles of $CO_2$) were heated to 180° in a 20 liter stirred steel autoclave.

A mixture of 0.875 kilogram (7 moles) of cyclohexanone cyanohydrin and 0.126 kilogram (7 moles) of water was pumped into the hot reaction solution at a rate of 1 mole of cyanohydrin per hour. After the seven hours required to pump the solution in, the temperature was maintained for a further four hours at 180° C. and then terminated.

The cooled reaction solution was steamed to dryness with the amino acid which had already precipitated. The crude amino acid remaining as a residue was washed with hot alcohol and dried at 50° C. under vacuum.

0.860 kilogram of a 93.3 percent 1-amino-cyclohexane carboxylic acid-1, were obtained in a yield amounting to 80.3 percent of the theoretical yield.

α-Amino-carboxylic acids are useful as animal food supplements. These acids are also useful in gas scrubbing applications where compounds such as glycine have been used in the so-called Alkazit process, as pharmaceutical intermediates, and as surface active compounds. The last property is demonstrated by the long carbon chain aminoacids derived from aldehydes such as myristaldehyde, and by the other amino acids after reacting these with long carbon chain fatty acid chlorides.

What is claimed is:

1. The method of making an α-amino carboxylic acid which comprises reacting a member selected from the group consisting of benzil and a compound of the formula

wherein R, taken alone, is selected from the group consisting of hydrogen and alkyl having up to 3 carbon atoms; $R_1$, taken alone, is selected from the group consisting of hydrogen; alkyl having up to 14 carbon atoms; alkyl having up to 14 carbon atoms substituted with hydroxy, lower alkoxy, or sulfhydryl; benzyl; phenyl; phenyl substituted with hydroxy, amino, or nitro; indolyl; pyridyl; and furfuryl; and wherein R and $R_1$, taken together with the carbonyl carbon atom to which they are bound, form a 5- to 7-membered cycloalkyl ring; with hydrocyanic acid, ammonia, and carbon dioxide in an aqueous medium at a temperature of at least 100° C., and then recovering the α-amino carboxylic acid formed from the medium.

2. The method of making an α-amino carboxylic acid which comprises reacting a cyanohydrin of a member selected from the group consisting of benzil and a compound of the formula

wherein R, taken alone, is selected from the group consisting of hydrogen and alkyl having up to 3 carbon atoms; $R_1$, taken alone, is selected from the group consisting of hydrogen; alkyl having up to 14 carbon atoms; alkyl having up to 14 carbon atoms substituted with hydroxy, lower alkoxy, or sulfhydryl; benzyl; phenyl; phenyl substituted with hydroxy, amino, or nitro; indolyl; pyridyl; and furfuryl; and wherein R and $R_1$, taken together with the carbonyl carbon atom to which they are bound, form a 5- to 7-membered cycloalkyl ring; with ammonia and carbon dioxide in an aqueous medium at a temperature of at least 100° C., and then recovering the α-amino carboxylic acid formed from the medium.

3. The method as in claim 1 wherein at least a portion of said ammonia and carbon dioxide are derived from ammonium carbonate or ammonium bicarbonate.

4. The method as in claim 1 wherein the approximate mole ratio of the other reactants to said carbonyl compound is as follows: hydrocyanic acid 1:1 to 3.5:1; carbon dioxide 1:1 to 10:1; ammonia 1:1 to 200:1; and water 20:1 to 1000:1.

5. The method as in claim 1 wherein said carbonyl compound and hydrocyanic acid are introduced into an aqueous solution of ammonia and carbon dioxide at a rate about equal to the rate at which said α-amino-carboxylic acid is formed.

6. The method as in claim 5 wherein said carbonyl compound and hydrocyanic acid are present in the reaction medium in a combined amount less than 10 percent by weight of the reaction medium.

7. The method as in claim 5 including the steps of continuously removing a portion of the amino-carboxylic acid formed from the reaction zone together with a portion of the reaction medium, separating the removed acid and the removed reaction medium, and continuously returning the latter to the reaction zone.

8. The method as in claim 2 wherein at least a portion of said ammonia and carbon dioxide are derived from ammonium carbonate or ammonium bicarbonate.

9. The method as in claim 2 wherein the approximate mole ratio of the other reactants to said cyanohydrin is as follows: carbon dioxide 1:1 to 10:1; ammonia 1:1 to 200:1; and water 20:1 to 1000:1.

10. The method as in claim 2 wherein said cyanohydrin is introduced into an aqueous solution of ammonia and carbon dioxide at a rate about equal to the rate at which said α-amino-carboxylic acid is formed.

11. The method as in claim 10 wherein said cyanohydrin is present in the reaction medium in an amount less than 10 percent by weight of the reaction medium.

12. The method as in claim 2 including the steps of continuously removing a portion of the amino-carboxylic acid formed from the reaction zone together with a portion of the reaction medium, separating the removed acid and the removed reaction medium, and continuously returning the latter to the reaction zone.

References Cited

Merck Index, Seventh Edition, pp. 1471, 1960.

ALAN L. ROTMAN, Primary Examiner

U.S. Cl. X.R.

99—2; 260—295.5, 326.14, 347.3, 404, 514, 518, 534